US011630500B2

(12) United States Patent
Chang et al.

(10) Patent No.: US 11,630,500 B2
(45) Date of Patent: Apr. 18, 2023

(54) CONFIGURING POWER LEVEL OF CENTRAL PROCESSING UNITS AT BOOT TIME

(71) Applicant: Hewlett-Packard Development Company, L.P., Spring, TX (US)

(72) Inventors: Yen Tang Chang, Taipei (TW); Chao Wen Cheng, Taipei (TW); Chien Chen Su, Taipei (TW); Po Ying Chih, Taipei (TW)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/418,802

(22) PCT Filed: Jul. 31, 2019

(86) PCT No.: PCT/US2019/044460
§ 371 (c)(1),
(2) Date: Jun. 26, 2021

(87) PCT Pub. No.: WO2021/021185
PCT Pub. Date: Feb. 4, 2021

(65) Prior Publication Data
US 2022/0171446 A1  Jun. 2, 2022

(51) Int. Cl.
*G06F 1/26* (2006.01)
*G06F 1/3203* (2019.01)
(Continued)

(52) U.S. Cl.
CPC .......... *G06F 1/3203* (2013.01); *G06F 9/4406* (2013.01); *G06F 11/2284* (2013.01); *G06F 1/3287* (2013.01)

(58) Field of Classification Search
CPC .. G06F 1/3203; G06F 9/4406; G06F 11/2284; G06F 1/3206
(Continued)

(56) References Cited

U.S. PATENT DOCUMENTS 7,702,931 B2   4/2010  Goodrum et al.
8,151,122 B1*  4/2012  Ranganathan ............ G06F 1/26
                                               713/340
(Continued)

FOREIGN PATENT DOCUMENTS

WO   2011/011668 A1   1/2011

OTHER PUBLICATIONS

Advanced Power Management Helps . . . , 2014, AMD, 9 pages.

*Primary Examiner* — Volvick Derose
(74) *Attorney, Agent, or Firm* — Knobbe, Martens, Olson & Bear, LLP

(57) ABSTRACT

Techniques for allocating power budget to a central processing unit (CPU) of a computing device are described. According to an example of the present subject matter, an unloaded component is detected. The unloaded component remains undetected upon completion of a boot process of the computing device. Thereafter, a power budget allocated to the unloaded component is determined. The power budget may be based on the thermal design power (TDP) of the computing device. Based on the power budget, a power configuration of the CPU is changed from a default power level to a high-performance power level, wherein the default power level corresponds to the TDP of the computing device and the high-performance power level is a power level above the default power level and upto a maximum power level of the CPU.

15 Claims, 5 Drawing Sheets

(51) Int. Cl.
  *G06F 9/4401* (2018.01)
  *G06F 11/22* (2006.01)
  *G06F 1/3287* (2019.01)
(58) Field of Classification Search
  USPC .......................................................... 713/320
  See application file for complete search history.

(56) References Cited

U.S. PATENT DOCUMENTS

| | | | |
|---|---|---|---|
| 8,386,808 B2 | 2/2013 | Therien et al. | |
| 9,081,557 B2 | 7/2015 | Ananthakrishnan et al. | |
| 9,201,486 B2 | 12/2015 | Jagadishprasad et al. | |
| 9,423,858 B2 | 8/2016 | Mann et al. | |
| 9,568,966 B2 | 2/2017 | Berke et al. | |
| 2004/0153786 A1* | 8/2004 | Johnson | G06F 11/3055 |
| | | | 714/E11.2 |
| 2004/0255171 A1* | 12/2004 | Zimmer | G06F 1/3203 |
| | | | 713/300 |
| 2006/0236087 A1 | 10/2006 | Ha | |
| 2007/0050644 A1* | 3/2007 | Merkin | G06F 1/206 |
| | | | 713/300 |
| 2013/0145180 A1* | 6/2013 | Branover | G06F 1/3206 |
| | | | 713/300 |
| 2013/0226362 A1* | 8/2013 | Jagadishprasad | G06F 1/3203 |
| | | | 700/297 |
| 2013/0226481 A1 | 8/2013 | Berke | |
| 2014/0067139 A1* | 3/2014 | Berke | G06F 1/26 |
| | | | 700/291 |
| 2014/0101475 A1* | 4/2014 | Berke | G06F 1/3287 |
| | | | 713/340 |
| 2014/0115351 A1* | 4/2014 | Ananthakrishnan | G06F 1/26 |
| | | | 713/300 |
| 2016/0291656 A1* | 10/2016 | Jenne | G05B 15/02 |
| 2017/0220362 A1 | 8/2017 | Jenne et al. | |
| 2017/0336841 A1* | 11/2017 | Ragupathi | G06F 1/26 |
| 2019/0065243 A1* | 2/2019 | Eckert | G06F 1/3225 |
| 2022/0405105 A1* | 12/2022 | Wu | H05K 1/028 |
| 2023/0000402 A1* | 1/2023 | Ajemba | G16H 50/30 |

\* cited by examiner

CONFIGURING POWER LEVEL OF CENTRAL PROCESSING UNITS AT BOOT TIME

BACKGROUND

Devices, such as smartphones, laptops, desktops, personal computers, and tablets, incorporate numerous components that generate heat during their operation. When a component, such as a processor of a device, operates under high workload, it may generate more heat than it generates during a normal operation. The heat is dissipated so as to maintain the temperature of the component within a predefined threshold. Accordingly, heat dissipating measures, such as heat-dissipating surfaces and cooling fans are incorporated in the devices.

BRIEF DESCRIPTION OF FIGURES

The following detailed description references the drawings, wherein.

DETAILED DESCRIPTION

Figure 1:
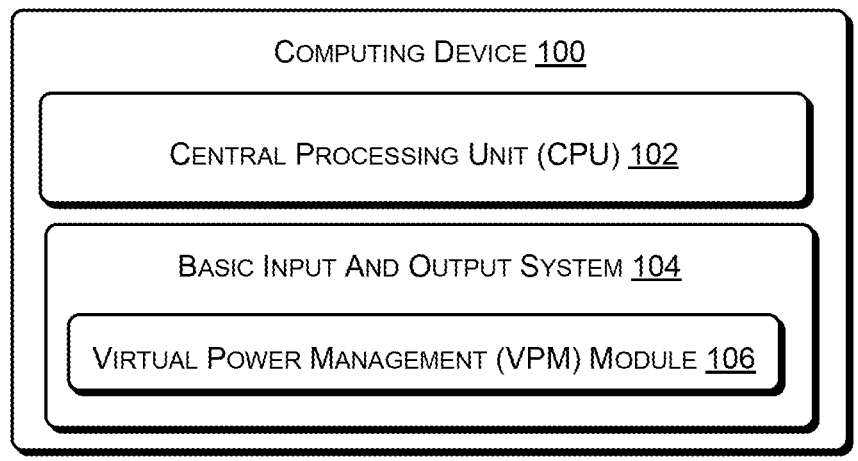
FIG. 1 illustrates a computing device enabling allocation of a power level to a central processing unit (CPU) of the computing device, in accordance with an example implementation of the present subject matter.

Generally, power management in computing devices is achieved by allocating a power budget to components of a computing device for their operation. The allocation of the power budget to the components of the computing device ensures that a thermal design power (TDP) of the computing device is adhered to, TDP being a maximum power that can be dissipated by the computing device. Distribution of power budget between the components of the computing device is such that a sum of the power allocated to the individual components does not exceed the TDP.

The power budget allocated for an individual component within the computing device is generally reserved for the corresponding component alone and cannot be attributed to another component in case the former component is not present. For example, if 30 W is allocated to two hard-disk drives (HDD) of the computing device (15 W for one HDD), even when no HDD is loaded of or a single HDD is loaded, the unused allocated power budget remains reserved.

In a similar manner, a central processing unit (CPU) of the computing device is also made to operate at a default power level based on a power budget allocated to the CPU according to the TDP of the computing device. The default power level is often set significantly below a maximum power limit of the CPU to consistently achieve a rated frequency guaranteed by a manufacturer of the CPU. Also, since the default power level of the CPU is based on the ability of the computing device to dissipate heat, the default power level may often be defined for a worst-case scenario, such as a fan for the CPU having a low-rating. Accordingly, a significant margin may exist between the default power level and the maximum power level of the CPU.

Thus, the CPU may be operating at a default power level defined for TDP conformance assuming complete utilization of allocated power budget by the components, while the power budget allocated to the components of the computing device may not be utilized. In cases where power budget allocated to the components of a computing device is not utilized, for example, due to a component not being operational, operating the CPU at the default power level for TDP conformance may result in performance loss.

According to an example implementation of the present subject matter, techniques for configuring a power level of CPUs of computing devices, to minimize performance loss by the CPU are described. In an example, a CPU of a computing device is assigned a power level above a default power level set for TDP conformance based on the unutilized power budget allocated to the other components of the computing device.

In an example implementation, an unloaded component of the computing device is detected. The unloaded component may be understood as a component of the computing device that remains undetected by the computing device upon completion of a boot process of the computing device. Thereafter, a power budget allocated to the unloaded component of the computing device is determined. For example, the power budget may be allocated to the unloaded component based on a thermal design power (TDP) of the computing device. Based on the determined power budget of the unloaded component, a power configuration of a CPU of the computing device is changed from a default power level to a high-performance level. The default power level of the CPU of the computing device corresponds to the TDP of the computing device and the high-performance power level is a power level above the default power level and up to a maximum power level at which the CPU is capable of operating. As a result, the power budget of the unloaded component is not reserved and is provided to the CPU to increase the power level of the CPU. Increasing the power level of the CPU in turn results in faster processing of workloads by the CPU.

The above techniques are further described with reference to FIG. 1 to FIG. 5. It should be noted that the description and the figures merely illustrate the principles of the present subject matter along with examples described herein and should not be construed as limiting the present subject matter. It is thus understood that various arrangements may be devised that, although not explicitly described or shown herein, embody the principles of the present subject matter. Moreover, all statements herein reciting principles, aspects, and implementations of the present subject matter, as well as specific examples thereof, are intended to encompass equivalents thereof.

FIG. 1 shows an example computing device 100 enabling allocation of a power level to a central processing unit (CPU) 102 of the computing device 100 at boot time, according to an example implementation of the present subject matter. Examples of the computing device 100 include, but are not limited to, an electronic device, such as a desktop computer, a personal computer, a laptop, a smartphone, a personal digital assistant (PDAs), and a tablet.

In an example, the CPU 102 of the computing device 100 may be implemented as microprocessors, microcomputers, microcontrollers, digital signal processors, central processing units, state machines, logic circuitries, and/or any devices that manipulate signals based on operational instructions. Among other capabilities, the CPU 102 is configured to fetch and execute computer-readable instructions stored in a memory of the computing device 100 (not shown in FIG. 1). The computing device 100 may comprise other components, such as a Random-Access Memory (RAM), graphics processor, hard disk drive (not shown in this figure).

The computing device 100 further includes a basic input and output system (BIOS) 104 communicatively coupled the CPU 102. The BIOS 104 performs a boot process to prepare the computing device 100 for use. When the computing device 100 is powered ON, the CPU 102 of the computing device 100 is initialized, in other words, provided with electrical power which invokes the BIOS 104. The BIOS 104, thereafter, loads an operating system (OS) of the computing device 100 and interfaces the components of the computing device 100 with the OS to prepare the computing device 100 for use.

In accordance with an example implementation of the computing device 100, the BIOS 104 also comprises configuration information for power management of the computing device 100. In an example, for power management of the computing device 100, a power budget is allocated to the components of the computing device 100. The power budget may be based on a thermal design power (TDP) of the computing device 100. The TDP of the computing device 100 is an amount of power that can be dissipated by a cooling system of the computing device 100. In an example, the TDP of a computing device 100 may be based on a rating of a fan of the CPU 102 of the computing device 100. Accordingly, the BIOS 104 comprises the power level assigned to the components based on the power budget allocated to the respective components.

Further, based on the TDP of the computing device 100, a default power level may also be defined for the CPU 102. The CPU 102 may have a clock frequency or frequency of operation corresponding to the default power level. In an example implementation, the default power level may be selected from amongst a plurality of configurable power levels of the CPU 102, namely P0-Pn, wherein, in an example, the P0 state may be the default power level. The power level P1-Pn may be higher than the default power level and may have higher corresponding clock frequencies. For example, the default power level of the CPU 102 may be 95 W (P0), while the CPU 102 may have other configurable higher power levels, such as 101 W (P1), 105 W (P2) and so on. In an example, the clock frequency corresponding to the default power level (P0:95 W) maybe 2.5 GHz, while the clock frequency corresponding to the power level 101 w (P1) maybe 2.7 GHz and the clock frequency corresponding to the power level 105 W (P2) maybe 2.9 GHz During the booting process, the BIOS 104 detects unloaded components of the computing device 100. The unloaded component may be a component of the computing device that would remain undetected after completion of booting process. In other words, a component, which the BIOS 104 detects, would remain non-operational or not interface with the OS of the computing device 100 upon completion of the booting process, is identified to be an unloaded component. For example, if a hard disk drive is not coupled with the computing device, the hard disk drive would remain undetected after the completion of booting process or, in other words, may not interface with the OS after the completion of the booting process.

In accordance with an example implementation of the present subject matter, the BIOS 104 comprises a virtual power management (VPM) module 106 to determine a power budget allocated to the unloaded component of the computing device 100. In an example, the VPM module 106 may reside in a memory of the BIOS 104. In another example, the VPM module 106 may be implemented as separate hardware coupled to the BIOS 104. The VPM module 106 may include routines, programs, objects, components, data structures, and the like, which perform particular tasks or implement particular abstract data types. The VPM module 106 may further include electronic circuitry or a combination of electronic circuitry and control programs that may control various functions as described herein.

In an example implementation, the VPM module 106 may configure a power level of the CPU 102 based on the power budget of the unloaded component. For example, if power budget corresponding to the unloaded component or, in other words, unused power, is found to exist in the computing device 100, the VPM module 106 may change the default power level of the CPU 102 to a high-performance power level of the computing device 100. The high-performance power level is higher than the default power level and is less than a maximum power level of the CPU 102. In an example, the default power level of the CPU 102 may be 95 W and the high-performance power level of the CPU 102 may be 100 W while the maximum power level of the CPU maybe 105 W. In another example, the 100 W may be the default power level and the high-performance power level maybe 105 W.

Figure 2:
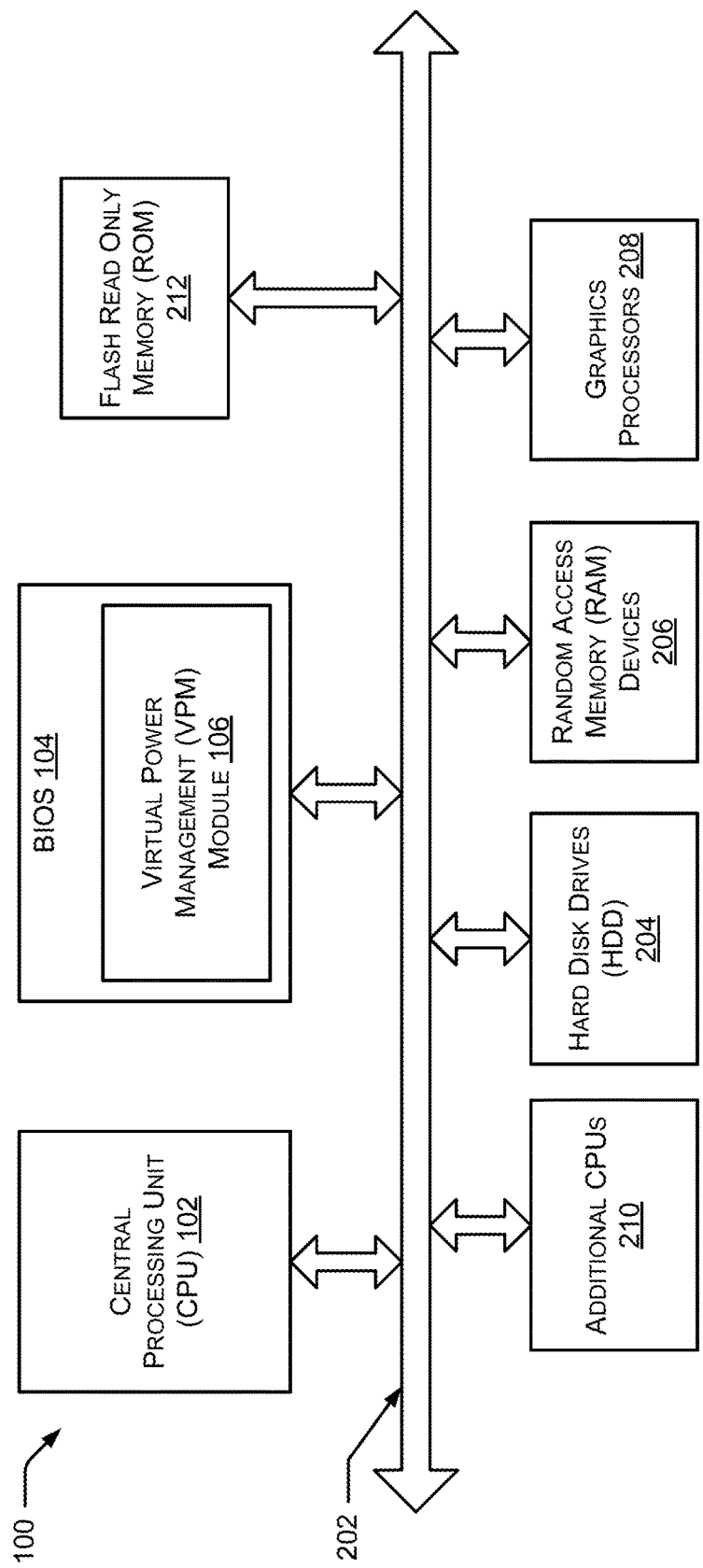
FIG. 2 illustrates the computing device, in accordance with another example implementation of the present subject matter.

FIG. 2 illustrates the computing device 100, in accordance with another example implementation of the present subject matter. As described earlier, the computing device 100 comprises the CPU 102 that is coupled to the BIOS 104 to boot the computing device 100.

The functions of the various elements shown in the figures, including any functional blocks labeled as "CPU", may be provided through the use of dedicated hardware as well as hardware capable of executing software. When provided by a CPU, the functions may be provided by a single dedicated CPU, by a single shared CPU, or by a plurality of individual CPUs, some of which may be shared. Moreover, explicit use of the term "CPU" should not be construed to refer exclusively to hardware capable of executing software, and may implicitly include, without limitation, digital signal processor (DSP) hardware, network processor, application specific integrated circuit (ASIC), field-programmable gate array (FPGA), read-only memory (ROM) for storing software, non-volatile storage. Other hardware may also be included.

Apart from the CPU 102 and the BIOS 104, the computing device 100 may also comprise various other components coupled to the CPU 102 via a system bus 202. The system bus 202 may include a control bus, an address bus, and a data bus of the computing device 100. The system bus 202 may be used for communicating between the components and the CPU 102 of the computing device 100.

The computing device 100 may comprise an internal storage medium such as one or more hard disk drives (HDDs) 204 that may store various data including an operating system (OS) of the computing device 100 that the CPU 102 may execute. In an example, the HDDs 204 may be a Parallel Advanced Technology Attachment (PATA) HDD, a serial advanced technology attachment (SATA) HDD, small computer system interface (SCSI) HDD, solid-state drive (SSD) HDD or a combination thereof. In operation, from amongst the plurality of HDDs 204, the computing device 100 may operate with any number of HDDs while the other HDDs may be unloaded. For example, considering that the computing device 100 comprises three HDDs, one HDD may be loaded while two HDDs may be unloaded.

Similarly, the computing device 100 may include random access memory (RAM) devices 206 to hold information related to running programs on the computing device 100. In an example, the RAM devices 206 may include a Static RAM (SRAM), dynamic RAM (DRAM), synchronous dynamic RAM (SDRAM), single data rate synchronous dynamic ram (SDR SDRAM), double data rate synchronous dynamic RAM (DDR SDRAM), graphics double data rate synchronous dynamic RAM (GDDR SDRAM) etc., or any combination thereof.

The computing device 100 may employ a plurality of graphics processors 208 to perform the processing of complex and detailed images, animations, videos, etc.

Further, in an example, the computing device 100 may be a multiprocessor computing device 100 and the computing device 100 may employ additional CPUs 210. For example, in a multiprocessor configuration of the computing device 100, the computing device 100 may include a first CPU, hosting a first OS, and a second or an additional CPU, hosting a second OS, such that both the first and the second OS enable different functionalities in the computing device 100.

The computing device 100 may also include a flash read-only memory (ROM) 212 as a rewriteable memory component to store information, such as firmware of the computing device 100 to allow periodic updates. In an example, the flash ROM 212 may store information that the BIOS 104 may need for facilitating booting of the computing device 100. For example, the flash ROM 212 may store power management data of the components, such as the power budget of the various components.

In operation, when the computing device 100 is powered ON, the BIOS 104 is invoked to execute the booting process to prepare the computing device 100 for use. In the boot process, the BIOS 104 loads the OS of the computing device 100 into a RAM device 206 of the computing device 100 for execution by the CPU 102 and interfaces the components of the computing device 100 with the OS, such that the OS is provided control of the components. The BIOS 104 performs a series of actions to complete the booting process.

To initiate the booting process, the BIOS 104 performs a power-ON-self test (POST) operation to identify the loaded and the unloaded components of the computing device 100 and verify if the components are functioning properly. The unloaded components are the components which the BIOS 104 detects upon completion of POST to be non-operational or not interfaced with the computing device 100. Accordingly, components that would not interface with the OS of the computing device 100 upon completion of the booting process, may be identified as the unloaded components. Similarly, the loaded components are the components that are operational, coupled to the computing device 100 and that are to be interfaced with the OS of the computing device 100. In an example, a component may be determined to be unloaded component when the component is malfunctioned or not active, such that the component cannot be interfaced with the OS of the computing device 100.

In an example, out of a first and a second HDDs of the computing device 100, the first HDD may be coupled to the computing device 100 while the second HDD may be decoupled from the computing device 100 or may have been found to be non-responsive during POST, in that case the BIOS 104 may identify the second HDD as the unloaded component.

In another example, as already discussed above, there may be a plurality of additional CPUs 210 in the computing device 100, wherein the plurality of additional CPUs 210 may have their own OS. In an operation, if the OS corresponding to an additional CPU is not initialized, the BIOS 104 may identify the additional CPU as the unloaded component. In yet another example, a graphics processor out of the plurality of the graphics processors 208 of the computing device 100 may not be loaded and may be identified as the unloaded component. Similarly, 'n' number of RAM devices 206, from amongst the plurality of RAM devices 206 of the computing device 100 may be the unloaded components. Thus, in various example implementations of the present subject matter, different combinations of one or more loaded and unloaded components may be identified.

After the unloaded components are determined, the VPM module 106 determines a power budget corresponding to such unloaded components. Based on the power budget of the unloaded components, the VPM module 106 of the BIOS 104 changes a power configuration of the CPU 102 from the default power level to the high-performance power level. In an example, the CPU 102 may have configurable power levels, from P0-Pn, P0 being the default power level and the Pn being the maximum power level. In an example, the VPM module 106 of the BIOS 104 may change the power level of the CPU 102 from the default power level P0 to P1, P2 or Pn, based on the power budget of the unloaded components.

To change the power configuration of the CPU 102, the VPM module 106 determines a power budget for the unloaded components. As explained earlier, the components have a power budget based on the TDP of the computing device 100. The information about the power budget of the components may be stored in a flash ROM 212. In another example, the power budget information may be stored in some other memory location which may be accessible to the BIOS 104. The VPM module 106 of the BIOS 104 determines the power budget of the unloaded components. The power budget of an unloaded components is the power allocated for the unloaded component that would have been consumed had the unloaded components been loaded onto the computing device 100. In an example, the VPM module 106 may determine the power budget of an HDD of a graphics processor that may be unloaded. Based on the determined power budget of the unloaded components, the BIOS 104 determines a high-performance power level for the CPU 102 and changes a power level of the CPU 102 of the computing device 100 from the default power level to the high-performance power level.

As mentioned previously, the CPU 102 may have more than one configurable power levels. In an example, the flash RAM 212 may store the details of the configurable power level of the CPU 102. In an example, the configurable power levels may have associated operating parameters, such as operating temperature, operating frequency, maximum temperature, etc. For example, an 85 W (P0) power level of the CPU 102 may have an operating temperature of 40° C., operating frequency of 2.5 Ghz, a maximum temperature of 60° C. Similarly, a 100 W (P1) power level of the CPU 102 may have an operating temperature of 40° C., operating frequency of 2.5 Ghz, the maximum temperature of 60° C., in an example. The VPM module 106 of the BIOS 104 may access the flash ROM 212 to determine the high-performance power level for the CPU 102 based on the power budget of the unloaded components. Once the high-performance power level is determined, the VPM module 106 may change the power level of the CPU 102 from the default power level to the high-performance power level. In an example, to change the power level of the CPU 102, the VPM module 106 may change a power level value in a model specific register (MSR) of the CPU 102. The power level provided to the CPU 102 is based on the power level value mentioned in the MSR. Thus, in an example, to change the power level of the CPU 102, the VPM module 106 may change the power level value in the MSR to a power level value corresponding to the high-performance level.

Considering an example, if the unloaded component is determined to be an HDD and the power budget corresponding to the HDD is 15 w, a default power level of the CPU 102, which may be 85 w, for instance, may be revised to a high-performance level of about 100 W, (85 W+15 W).

The VPM module 106 changes the power level of the CPU 102 from the default power level to the high-performance level, such that the high-performance level corresponds to one of the higher configurable power levels of the CPU 102. For example, the change in power level may be in proportion to the sum of the power budgets of the unloaded components. For example, if it is determined that two HDDs are unloaded and the power budget for one unloaded HDD is 15 W, the VPM module 106 may configure the power level of the CPU 102 from the default power level 85 W (P0) to a high-performance power level of 115 W (P2) (85 W+15 W+15 W). Thus, in this case, an intermediate power level of 100 W of the CPU 102 may be bypassed.

In situations where the CPU 102 has no higher configurable power level corresponding to the sum of the power budgets of the unloaded components, the closest higher configurable power level may be selected. For example, consider that the CPU 102 has configurable power levels of 85 W, 100 w, 115 W, 130 W and 145 W. If an HDD and a graphics processor, with a power budget of 20 W each are determined to be unloaded, the total power budget of the unloaded components is 40 W. In this case, assuming that the CPU 102 is operating at the default power level of 85 W, the high-performance power level, based on the unused power, may correspond to about 125 w (85 W+40 W). However, since the CPU 102 does not include a configurable power level corresponding to 125 W, the configurable power levels 115 W or 130 W may be selected.

After the power level of the CPU 102 is changed, the CPU 102 operates at a higher clock frequency corresponding to the high-performance power level. For example, if the CPU 102 is configured from the default power level of 85 W, 2.5 Ghz to a high-performance power level of 100 W, 2.7 Ghz, the CPU 102 would operate at 2.7 Ghz. High clock frequency operation increases the processing efficiency of the CPU 102.

In an example, the VPM module 106 may change the power level configuration of the CPU 102 based on a hardware configuration of the computing device 100. In one example implementation, based on the POST operation, once the BIOS 104 has detected the loaded and unloaded components, the BIOS 104 may ascertain a current hardware configuration of the computing device 100. For example, the current hardware configuration may comprise a list of the loaded and the unloaded components. The current hardware configuration, indicative of the loaded and the unloaded components of the computing device 100, may be stored in the flash ROM 212 by the BIOS 104.

The BIOS 104 may compare the current hardware configuration with a previous hardware configuration wherein the previous hardware configuration may be indicative of the loaded and unloaded components of the computing device during a previous booting process. In an example, whenever the computing device 100 is booted up, the BIOS 104 may determine a hardware configuration of the computing device 100 and may store the determined hardware configuration in the flash ROM 212 or any other memory location as specified by the BIOS 104. Thus, in an example, the previous hardware configuration mentioned above may be the hardware configuration that was stored in a previous booting up process of the computing device 100. For the comparison, the BIOS 104 may retrieve the previous hardware configuration from the flash ROM 212. Based on the comparison, the BIOS 104 determines a change in the current hardware configuration.

In an example, the components may have associated flags to indicate if a corresponding component is loaded or unloaded. For example, zero value of flag may indicate that the component is not loaded while a value 1 of the flag may indicate that the component is loaded. Thus, the hardware configuration may be a combination of the values of the flags for the components of the computing device 100. The comparison may be done between the current hardware configuration and the previous hardware configuration based on the values of the flags allocated to components in the current hardware configuration and the previous hardware configuration. Thus, based on the comparison of the value of the flags, a change in the hardware configuration may be determined.

For example, it is possible that in the previous hardware configuration, two graphics processors were loaded while a single graphics processor is loaded in the current hardware configuration. Thus, a change in configuration may be indicative of the one graphics processor being an unloaded component in the current hardware configuration.

When comparison of the current hardware configuration with the previous hardware configuration reveals that the current hardware configuration is different from the previous hardware configuration, the VPM module 106 of the BIOS 104 may initiate change in the power level of the CPU 102 following the process explained above. However, if it is determined that the hardware configuration is the same as the previous hardware configuration, the VPM module 106 may not change the power level of the CPU 102. Also, in cases where the change reveals a higher number of loaded components in the current hardware configuration as compared to the previous hardware configuration, the VPM module 106 may not change the power level of the CPU 102. Accordingly, upon completion of the POST operation, if no change in the current hardware configuration occurs, the BIOS 104 proceeds to further execute the booting process.

To further execute the booting process, the BIOS 104 generates interrupt routines for the loaded components of the computing device 100. Interrupts are signals sent to the CPU 102 by a component to request the OS to halt its current operation and perform operations indicated by the component. The interrupt routines generated by the BIOS 104, interface the loaded components with the OS of the computing device 100, by enabling the OS to recognize the interrupt signals when generated by the components. Based on the interrupt routines, the components may call the CPU 102 when needed to perform any operation. After the generation of the interrupt routines, the booting process is complete and the OS is interfaced with the loaded components such that the loaded components may communicate directly with the OS.

Figure 3:
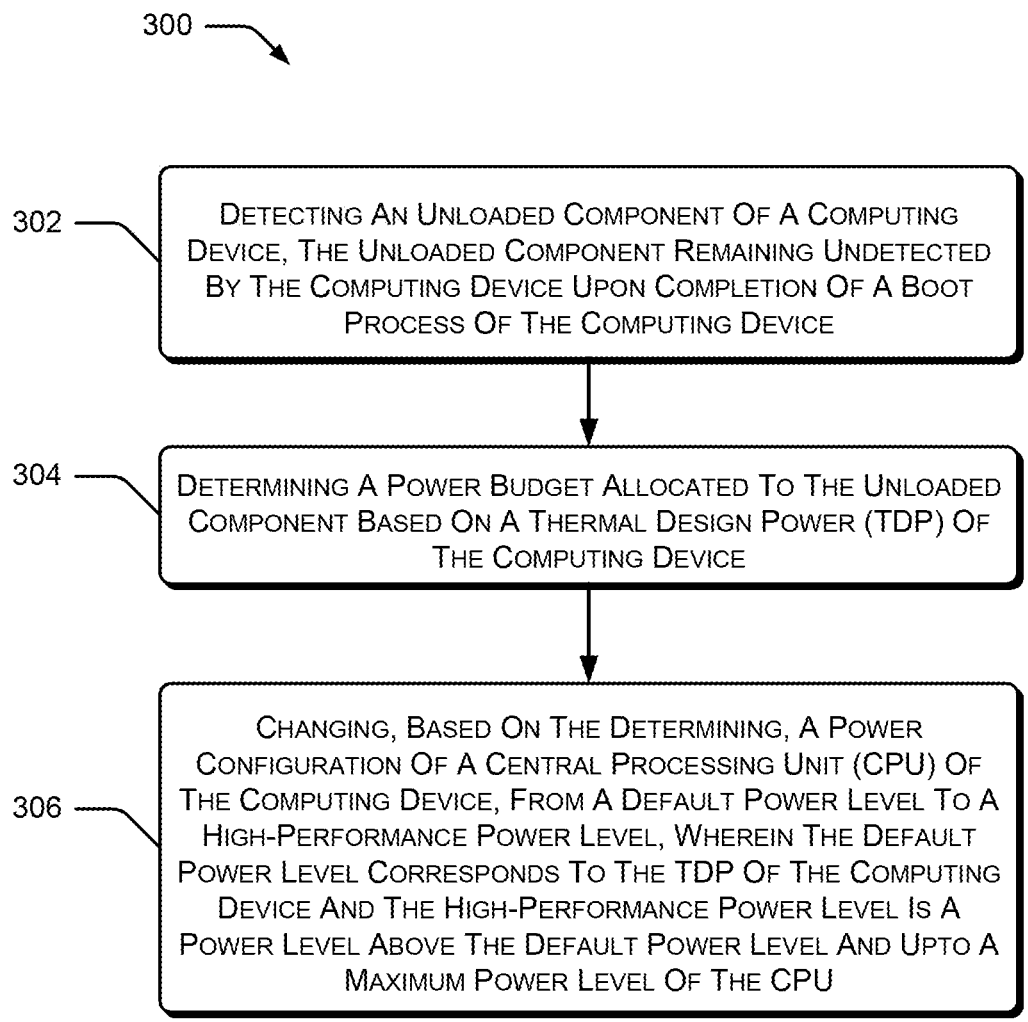
FIG. 3 illustrates a method for allocating a power level to a CPU of a computing device, according to an example of the present subject matter.

FIG. 3 illustrates a method 300 for allocating a power level to a central processing unit (CPU) of a computing device, according to an example implementation of the present subject matter. Although the method 300 may be implemented in a variety of electronic devices, for the ease of explanation, the present description of the example method 300 for configuring power level of the CPU is provided in reference to the above-described computing device 100. The method 300 may be implemented by a processor(s) or computing device(s) through any suitable hardware, non-transitory machine-readable instructions, or combination thereof.

It may be understood that blocks of the method 300 may be performed by programmed computing devices. The blocks of the method 300 may be executed based on instructions stored in a non-transitory computer readable medium, as will be readily understood. The non-transitory computer readable medium may include, for example, digital memories, magnetic storage media, such as magnetic disks and magnetic tapes, hard drives, or optically readable digital data storage media.

Referring to FIG. 3, at block 302, at least one unloaded component of the computing device 100 is detected. In an example, the unloaded component is a component of the computing device 100 that remains undetected upon completion of a boot process of the computing device. As mentioned previously, the unloaded component may be a malfunctioning component or an unloaded component, such that the BIOS 104 of the computing device 100 does not interface the component with the OS of the computing device 100 during booting-up the computing device 100. For example, in an operation, a hard disk drive may not be loaded and thus, when the booting process is completed, the hard disk drive may not be interfaced with the OS computing device 100. In this case, the hard disk drive may be considered as the unloaded component. Similarly, a RAM and a graphics processor may the unloaded components in other examples.

At block 304, a power budget allocated to at least one unloaded component is determined. The power budget of the unloaded component may be based on the TDP of the computing device 100. For example, for the purpose of power management in the computing device 100, various components of the computing device 100 may be allocated a power budget, such that when the components operate in accordance with the allocated of power budget, the heat generated in the computing device 100 is within the TDP limit. However, the unloaded component may not contribute to the heat generated in the computing device 100.

At block 306, a power configuration of the CPU 102 is changed based on the power budget corresponding to the at least one unloaded component, determined at block 304. According to an example implementation, the power configuration of the CPU 102 is changed from a default power level to a high-performance power level, wherein the default power level is based on the TDP of the computing device 100 and the high-performance power level is the power level above the default power level and less than a maximum power level of the CPU 102.

In an example, the CPU 102 may have multiple configurable power levels with the default power level being power level at which the CPU 102 operates upon being initialized. The default power level, however, may be revised to a high-performance power level, based availability of unused power budget of unloaded components of the computing device 100.

Figure 4:
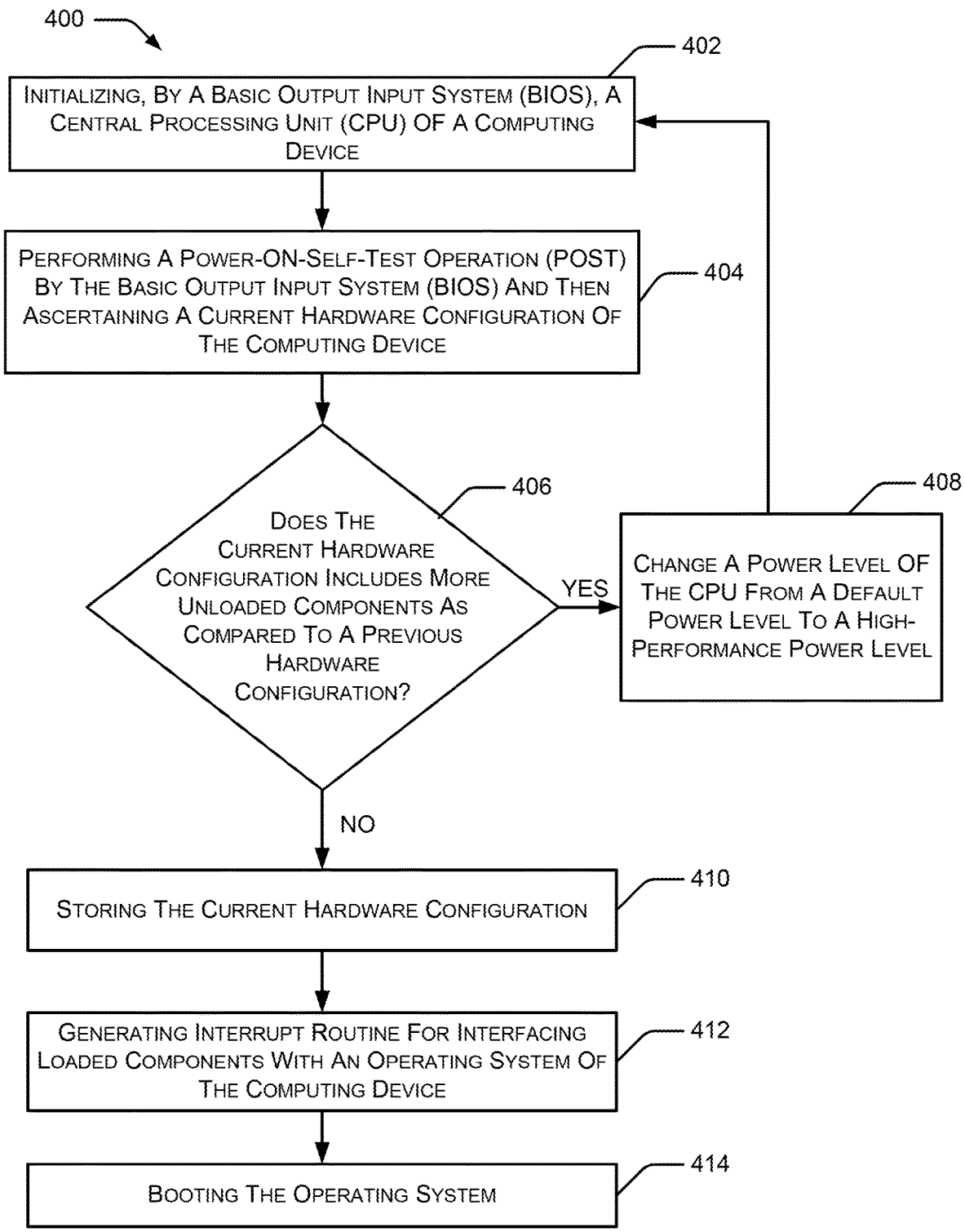
FIG. 4 illustrates a method of booting of a computing device, according to an example of the present subject matter.

FIG. 4 illustrates a method 400 of booting of a computing device, according to an example implementation of the present subject matter. Although the method 400 be implemented in a variety of electronic devices, for the ease of explanation, the present description of the example method 400 to boot the computing device is provided in reference to the above-described computing device 100. The method 400 may be implemented by a processor(s) or computing device (s) through any suitable hardware, non-transitory machine-readable instructions, or combination thereof.

It may be understood that blocks of the method 400 may be performed by programmed computing devices. The blocks of the method 400 may be executed based on instructions stored in a non-transitory computer readable medium, as will be readily understood. The non-transitory computer readable medium may include, for example, digital memories, magnetic storage media, such as magnetic disks and magnetic tapes, hard drives, or optically readable digital data storage media.

Referring to FIG. 4, at block 402, a CPU 102 of the computing device 100 is initialized when the computing device 100 is powered ON. At this block, the BIOS 104 initializes the CPU 102. At block 404, the BIOS 104 performs a power-ON-self-test (POST) to ascertain a current hardware configuration of the computing device 100, based on the POST. The current hardware configuration reveals loaded and unloaded components of the computing device 100.

At block 406, it is determined if the current hardware configuration includes more unloaded components in comparison to a previous hardware configuration. In an example, the previous hardware configuration may be the hardware configuration as determined and stored by the BIOS 104 in a previous booting process. If the detection made at the block 406 is in the affirmative, the method proceeds to block 408. However, if it is determined, at block 406, that the current hardware configuration is the same as the previous hardware configuration or includes more loaded components as the previous hardware configuration, the method proceeds to block 410.

At block 408, a power level of the CPU is changed from a default power level to a high-performance power level. As explained earlier, the VPM module 106 of the BIOS 104 changes the power level of the CPU from the default power level to the high-performance power level. In an example, there may be more than one high-performance power level and the VPM module 106 may configure the CPU 102 to a high-performance power level based on the power budget of the unloaded components. As explained earlier, to change the power level, the VPM module 106 may change a power level value mentioned in a model specific register of the CPU 102. The VPM module 106 may change the power level value to a power level value corresponding to the high-performance power level. Thereafter, the method thereafter proceeds to block 402. At block 402, the CPU 102 would now be initialized to operate at a voltage defined in accordance with the high-performance power level.

Referring again to block 406, if it is determined that the hardware configuration has changed such that the current hardware configuration has higher number of loaded components than the previous hardware configuration, the method proceeds to block 410. At block 410, the BIOS 104 stores the hardware configuration so as to use it during next boot up. In an example, the previous hardware configuration may be overwritten by the current hardware configuration when the current hardware configuration is different from the previous hardware configuration. The method thereafter proceeds to block 412.

At block 412, the BIOS 104 generates an interrupt routine for interfacing loaded components identified in the hardware configuration with the OS of the computing device 100. The interrupt routine is used by the loaded components to call the OS when needed to perform any operation. Thereafter, the method proceeds to block 414 and the OS is booted with the CPU 102, operating at the high-performance power level.

Figure 5:
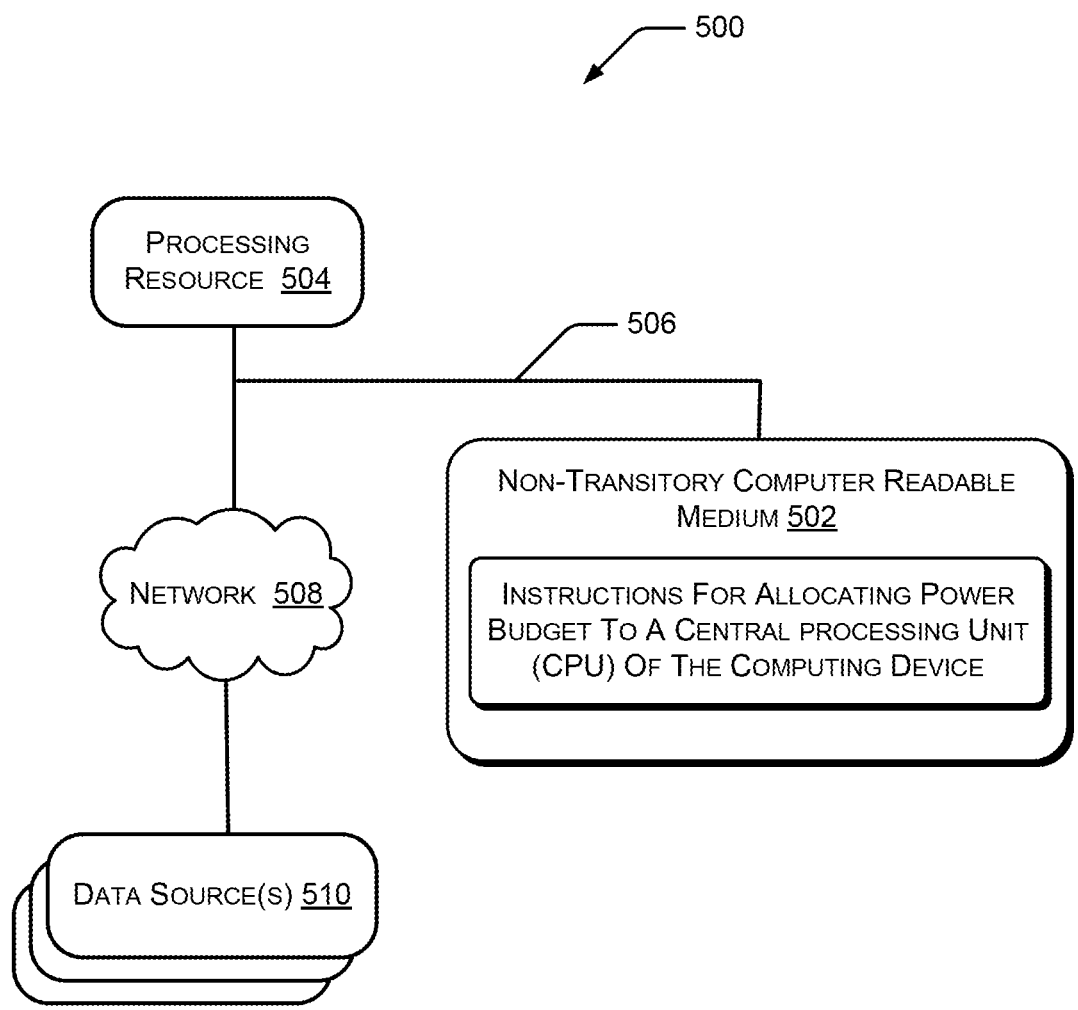
FIG. 5 illustrates a computing environment for allocating power budget to a CPU of the computing device, according to an example implementation of the present subject matter.

FIG. 5 illustrates a system environment 500 implementing a non-transitory computer-readable medium 502 for allocating power budget to a central processing unit (CPU) of a computing device at boot time, according to an example of the present subject matter. In an example implementation, the system environment 500 may be a computing device, such as the computing device 100. The system environment 500 includes a processing resource 504 communicatively coupled to the non-transitory computer-readable medium 502 through a communication link 506. In an example, the processor resource 502 fetches and executes computer-readable instructions from the non-transitory computer-readable medium 502.

The non-transitory computer-readable medium 502 can be, for example, an internal memory device or an external memory device. In an example implementation, the communication link 506 may be a direct communication link, such as any memory read/write interface. In another example implementation, the communication link 506 may be an indirect communication link, such as a network interface. In such a case, the processing resource 504 can access the non-transitory computer-readable medium 502 through a network 508. The network 508 may be a single network or a combination of multiple networks and may use a variety of different communication protocols.

The processing resource 504 and the non-transitory computer-readable medium 502 may also be communicatively coupled to data source(s) 510. The data source(s) 510 may be used to store data, such as power configuration information comprising power budget data, details of the power level of the CPU of the computing device, in an example. In an example implementation, the non-transitory computer-readable medium 502 includes a set of computer-readable instructions for changing the power level of the computing device. The set of computer-readable instructions can be accessed by the processing resource 504 through the communication link 506 and subsequently executed to authorize the access to the capturing device.

In an example, the non-transitory computer-readable medium 502 may include a set of instructions implementing a virtual power management module 106. The instructions implementing the virtual power management module 106 may, in one example, be a code executable to change, at boot time of the computing device, the power level of the computing device from a default power level to a high-performance power level.

In an example, the non-transitory computer-readable medium 502 may include a set of instructions that may, in one example, be executable by the by the processing resource 504 to determine a power budget corresponding to at least one unloaded component of the computing device, the unloaded component being a component of the computing device that remains unavailable to an OS of the computing device during a boot process of the computing device 100 of the computing device 100. As discussed earlier, the unloaded component is a component of the computing device that remains undetected upon completion of the boot process and thus, the component would be unavailable to the OS of the computing device after the boot process is completed. In an example, the unloaded component may be a hard disk drive (HDD), a graphics processor, a RAM, etc. Further, as explained previously, the power budget allocated to the unloaded component is based on a thermal design power (TDP) of the computing device.

To determine the unloaded components of the computing device, in an example, the instructions may cause the processor resource 504 to perform a power-on self-test (POST). Based on the POST, the instructions may cause the processing resource 504 to determine a hardware configuration of the computing device indicative of the unloaded and loaded components of the computing device.

Further, the instruction may cause the processing resource 504 to compare the hardware configuration with a previous hardware configuration to detect a change in the hardware configuration due to any component being unloaded from the computing device or being rendered malfunctional. The instruction may thereafter cause the processing resource 504 to determine a power budget corresponding to the unloaded component. For example, the computing device may be a multiprocessor device and by comparing the hardware configuration with a previous hardware configuration, the processing resource may determine an additional CPU of the computing device to be the unloaded component (in the current hardware configuration) if an operating system corresponding to the additional CPU is uninitialized. In this example, the instruction may cause the processing resource to determine the power budget corresponding to the additional CPU.

After the power budget of the unloaded components is determined, the instructions implementing the VPM module may, in one example, may cause the processing resource 504 to allocate the power budget to the CPU of the computing device to change a power level configuration of the CPU from a default power level to a high-performance power level.

Thus, the methods and systems of the present subject matter provide for configuring the power level of a computing device based on unloaded components. Although implementations of configuring the power level have been described in a language specific to structural features and/or methods, it is to be understood that the appended claims are not necessarily limited to the specific features or methods described. Rather, the specific features and methods are disclosed as example implementations for power management of computing devices.

The invention claimed is:

1. A method comprising:
   detecting an unloaded component of a computing device, the unloaded component remaining undetected by the computing device upon completion of a boot process of the computing device;
   determining a power budget allocated to the unloaded component based on a thermal design power (TDP) of the computing device; and
   changing, based on the determining, a power configuration of a central processing unit (CPU) of the computing device, from a default power level to a high-performance power level wherein the default power level corresponds to the TDP of the computing device and the high-performance power level is a power level above the default power level and upto a maximum power level of the CPU.

2. The method as claimed in claim 1, wherein the detecting further comprises, performing, by a basic input output system (BIOS) of the computing device, a power-on self-test (POST) operation to discover the unloaded component.

3. The method as claimed in claim 2 further comprising:
   ascertaining, based on the POST operation, a current hardware configuration of the computing device, a hardware configuration identifying the unloaded component and loaded components of the computing device; and comparing the current hardware configuration with a previous hardware configuration, wherein changing the power configuration of the CPU is based on the comparing.

4. The method as claimed in claim 1, wherein changing the power configuration of the CPU comprises allocating the power budget of the unloaded component to the CPU.

5. A computing device comprising:

a central processing unit (CPU) having a maximum power level at which the CPU can operate and a default power level that corresponds to a thermal design power (TDP) of the computing device, the default power level being lower than the maximum power level;

a basic input output system (BIOS) coupled to the CPU, the BIOS comprising a virtual power management (VPM) module to:

determine a power budget allocated to an unloaded component of the computing device, the unloaded component being a component not to be interfaced with an operating system (OS) of the computing device upon booting of the OS; and configure, based on the power budget, a power level of the CPU to a high-performance power level at a boot time, the high-performance power level being a power level above a default power level of the CPU, the default power level corresponding to the thermal design power (TDP) of the computing device.

6. The computing device as claimed in claim 5, wherein the BIOS is to perform a power-on-self-test (POST) operation to detect the unloaded component of the computing device.

7. The computing device as claimed in claim 5, wherein the unloaded component is a malfunctioning component.

8. The computing device as claimed in claim 5, wherein the unloaded component is a hard disk drive (HDD) or a graphics processor.

9. The computing device as claimed in claim 5, wherein the computing device is a multiprocessor computing device and the unloaded component is an additional CPU of the computing device, the VPM module is to determine the power budget corresponding to the additional CPU when an operating system (OS) corresponding to the additional CPU is uninitialized.

10. A non-transitory computer-readable medium comprising instructions executable by a processing resource to:

determine a power budget corresponding to an unloaded component of a computing device, the unloaded component being a component unavailable to an operating system (OS) of the computing device upon completion of a boot process of the computing device, and wherein the power budget allocated to the unloaded component is based on a thermal design power (TDP) of the computing device; and allocate the power budget to a central processing unit (CPU) of the computing device to change a default power level of the CPU, corresponding to the TDP of the computing device, to a high-performance level, wherein the high-performance power level is a power level above the default power level and upto a maximum power level of the CPU.

11. The non-transitory computer-readable medium as claimed in claim 10, further comprising instructions executable by the processing resource to perform a power-on-self-test (POST) operation to detect the unloaded component.

12. The non-transitory computer-readable medium as claimed in claim 10, further comprising instructions executable by the processing resource to:

determine a hardware configuration of the computing device, the hardware configuration being indicative of the unloaded components and loaded components, wherein the loaded components are the components to be interfaced with the OS of the computing device; and compare the hardware configuration with a previous hardware configuration to detect a change in the hardware configuration, wherein the power budget is allocated to the CPU based on comparison.

13. The non-transitory computer-readable medium as claimed in claim 10, further comprising instructions executable by the processing resource to determine a malfunctioning component of the computing device as the unloaded component.

14. The non-transitory computer-readable medium as claimed in claim 10, further comprising instructions executable by the processing resource to allocate power budget corresponding to an additional CPU of the computing device to the CPU, when an operating system (OS) corresponding to the additional CPU is uninitialized.

15. The non-transitory computer-readable medium as claimed in claim 10, further comprising instructions executable by the processing resource to identify that the unloaded component is a hard disk drive (HDD), a graphics processor, or an additional CPU of the computing device.

* * * * *